United States Patent [19]
Maezawa et al.

[11] Patent Number: 5,604,029
[45] Date of Patent: Feb. 18, 1997

[54] MAGNETIC RECORDING MEDIA AND MANUFACTURING METHOD THEREOF

[75] Inventors: Yoshiharu Maezawa, Shiga-gun; Kazuyoshi Honda, Takatsuki, both of Japan

[73] Assignee: Matsushita Electric Industrial Co., Ltd., Osaka, Japan

[21] Appl. No.: 172,560

[22] Filed: Dec. 22, 1993

[30] Foreign Application Priority Data

Dec. 25, 1992 [JP] Japan .................. 4-357982

[51] Int. Cl.$^6$ .............. G11B 5/66; G11B 5/70; G11B 5/16
[52] U.S. Cl. ........... 428/327; 428/143; 428/328; 428/331; 428/332; 428/694 T; 428/694 TS; 428/694 TR; 428/694 SL; 428/694 SG; 428/900
[58] Field of Search ............ 428/323, 694 T, 428/694 TS, 694 TR, 694 SL, 141, 143, 327, 328, 402, 694 ST, 694 SG, 331, 900, 332, 329

[56] References Cited

U.S. PATENT DOCUMENTS

| | | |
|---|---|---|
| 4,550,049 | 10/1985 | Ono et al. .................... 428/141 |
| 4,590,119 | 5/1986 | Kawakami et. al. ............ 428/216 |
| 4,673,617 | 6/1987 | Yoshida et al. ............... 428/323 |
| 4,778,707 | 10/1988 | Arioka et al. ................. 428/141 |
| 4,816,933 | 3/1989 | Izumi et al. .................. 428/694 |
| 5,091,225 | 2/1992 | Goto ........................... 427/131 |
| 5,252,388 | 10/1993 | Murooka et al. .............. 428/328 |
| 5,284,699 | 2/1994 | Nishino et al. ................ 428/217 |
| 5,336,079 | 8/1994 | Okazaki et al. ............... 428/323 |

FOREIGN PATENT DOCUMENTS

| | | |
|---|---|---|
| 0277783 | 8/1988 | European Pat. Off. . |
| 58-153640 | 3/1982 | Japan . |
| 58-68225 | 4/1983 | Japan . |
| 58-68227 | 4/1983 | Japan . |

*Primary Examiner*—Paul J. Thibodeau
*Assistant Examiner*—Stephen Sand
*Attorney, Agent, or Firm*—Ratner & Prestia

[57] ABSTRACT

A magnetic recording media is manufactured which includes a composite polymer film, which is formed of a flat surfaced polymer film and both inorganic particles and organic particles dispersed on and attached to the surface of the polymer film, and a magnetic film disposed over the particles which are attached on the surface of said composite polymer film. The magnetic recording media satisfies the performance requirements of magnetic recording media in a balanced manner including electromagnetic conversion characteristics, picture drop out performance, and running characteristics of magnetic recording tapes, and at the same time maintaining the foregoing performance characteristics even after repeated use of the magnetic recording tapes.

9 Claims, 3 Drawing Sheets

MAGNETIC RECORDING MEDIA AND MANUFACTURING METHOD THEREOF

BACKGROUND OF THE INVENTION

The present invention relates to recording media for storage of information which are utilized in video equipment as well as information equipment. More specifically, the present invention relates to thin film magnetic recording media which have a structure of a magnetic thin film disposed on a polymer film surface.

In step with the development of information society, the recent technological progress in the magnetic recording media has been remarkable as exemplified by improvements in magnetic recording density.

One prior art magnetic recording media is a so called coating type magnetic recording medium which has been widely used in the form of magnetic tapes for audio equipment and video cassette recorders. The recording media is prepared by coating a mixture containing magnetic powders such as gamma iron oxide powder, chromium oxide powder, pure iron powder, some abrasives, and a binder such as a resin on a polymer film.

Another prior art magnetic recording media is a thin film magnetic recording medium which is intended for improving the performance of the aforementioned coating type magnetic recording medium in terms of coercive force, magnetic recording density, electromagnetic conversion characteristics. This magnetic recording media is prepared by disposing magnetic metal compounds such as iron, cobalt, nickel, chromium either alone or in the form of an alloy thereof, and compounds thereof (an oxide and a nitride, for example) on a glass substrate, an aluminum substrate or a polymer film substrate.

Still another prior art magnetic recording media is a thin film type magnetic recording medium for video cassette recorders which is prepared by disposing a ferromagnetic metal compound film on a polymer film surface by means of an oblique vacuum deposition method to improve the running characteristics of the magnetic recording medium.

The conventional production method for the foregoing thin film magnetic medium is first to attach inorganic particles to a flat film surface of a polymer like polyethyleneterephthalate, for example. Then a magnetic metal compound is disposed on the surface thereof by means of an oblique vacuum deposition method with an incident angle ranging from 90° to 40°.

FIG. 7 shows a schematically enlarged cross-sectional view of the foregoing conventional magnetic recording medium. In FIG. 7, inorganic particles 102 having an average particle diameter of 200 Å are attached on a flat surface of a polymer film 101. A magnetic film 103 is disposed thereon by means of a vacuum deposition method.

Although a reproducing tape for magnetically recording pictures for videocassette recorders formed of a composite polymer film prepared by attaching inorganic particles to a polymer film surface, as shown in the foregoing example of the prior art, will improve the running performance and durability of the tape, new problems are also created.

Specifically, the inorganic particles tend to stick together and once stuck together, the particles turn into irregular projections formed on the surface of the magnetic recording tape. As a result, new problems such as deteriorated electromagnetic conversion characteristics, disturbances in the picture images and quality arise because of increased drop out, unusual wear of the tape surface, uneven wear of a recording and reproducing head.

SUMMARY OF THE INVENTION

The present invention relates to a magnetic recording media having excellent performance characteristics including a high recording density as a magnetic recording media for use in video equipment as well as information equipment, superior running characteristics when used as magnetic recording tapes, and good picture characteristics when used with video cassette recorders. In addition, the present invention relates to achieving good long-term reliability without incurring deterioration in any of the aforementioned performance characteristics over a long period.

The present invention further relates to a magnetic recording media which comprises a composite polymer film, which is formed of a flat surfaced polymer film having both inorganic particles and organic particles dispersed and attached on the surface of the polymer film, and a magnetic film disposed on the surface of said composite polymer film where the particles are attached.

The present invention is also related to a manufacturing method of a magnetic recording media comprising the steps of disposing inorganic particles and organic particles by uniform dispersion and attachment thereof to a flat polymer film surface, and forming a magnetic film over the inorganic particles and organic particles attached to the polymer film surface.

The present invention further relates to providing a magnetic recording medium comprising a composite polymer film, which is formed of a flat surfaced polymer film, a metal compound thin film disposed on the polymer film surface, and both inorganic particles and organic particles dispersed and attached on the surface of the metal compound thin film, and a magnetic film disposed over said particles which are attached on the composite polymer film.

The present invention still further relates to providing a manufacturing method of magnetic recording media comprising the steps of forming a metal compound thin film on a flat surfaced polymer film, disposing inorganic particles and organic particles by uniform dispersion and attachment thereof on the thin film surface of the metal compound, and forming a magnetic film over said inorganic particles and organic particles which are attached on the surface of the metal compound film.

When the magnetic recording media structured as described above and prepared according to the aforementioned manufacturing method are used with video cassette recorders, excellent performances for electromagnetic conversion characteristics, drop out performance, and running characteristics of magnetic recording tapes can be realized. In addition, good long-term reliability without causing deterioration in the aforementioned performance characteristics, even after repeated use of the magnetic recording tapes, can be also realized.

Particularly, the structure employing the composite polymer film wherein inorganic particles and organic particles are dispersed and attached to a polymer film surface has contributed to gaining the aforementioned characteristics.

How the above particular structure works is not yet clear, but it is assumedly caused by the following. Particularly, by applying a mixed coating of inorganic particles and organic particles. Particularly: 1) wear of a projections of the nonorganic particles caused by repeated use is compensated for by the effect brought about by the shapes of the organic particles, 2) cohesion of particles is reduced by an increased amount of particle dispersion which is caused by mixing the two kinds of particles, and 3) adhesion between the polymer film and the inorganic substance is intensified.

Finally, the manufacturing method whereby inorganic particles and organic particles are uniformly dispersed and attached to the surface of a polymer film prevent attachment of inorganic particles cohesively on the polymer film surface which is considered to cause a poor drop out performance and uneven wear of heads.

BRIEF DESCRIPTION OF THE DRAWINGS

FIG. 2(c) shows a schematically enlarged cross-sectional view of the magnetic recording medium of an exemplary embodiment of the present invention.

DETAILED DESCRIPTION OF THE INVENTION

With the help of drawings, the details of the present invention will be explained below.

Figure 1:
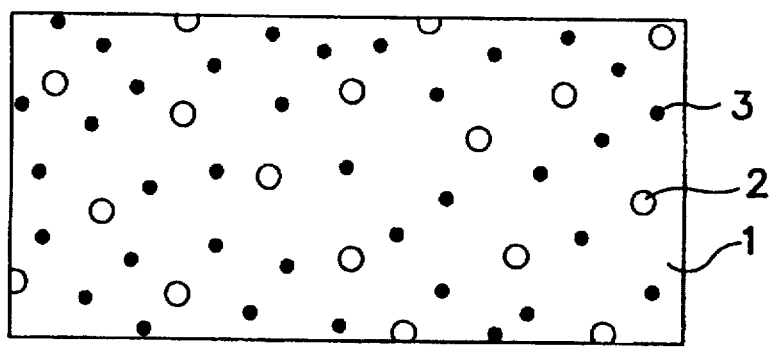
FIG. 1 shows an exemplary schematically enlarged view of the surface of a composite polymer film, on the surface of which inorganic particles and organic particles are attached. The composite polymer film makes an essential material for the magnetic recording media of the exemplary embodiment of the present invention.

FIG. 1 shows a schematically enlarged view of the surface of a composite polymer film which makes a base material for the exemplary magnetic recording media of the present invention.

In FIG. 1, a flat surfaced polymer film 1 is used as a base material, and inorganic particles 2 and organic particles 3 are disposed by uniform dispersion and attached to the surface of thepolymer film 1 to complete the composite polymer film.

Figure 2A:
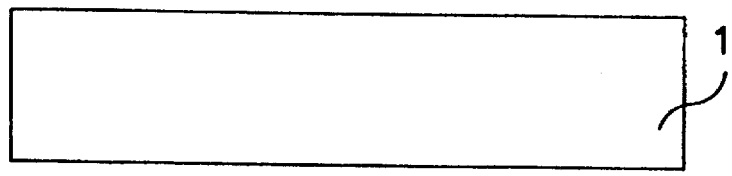
FIG. 2(a) to FIG. 2(c) show some of the manufacturing steps for a magnetic recording medium of an exemplary embodiment of the present invention. Particularly.
Figure 2B:
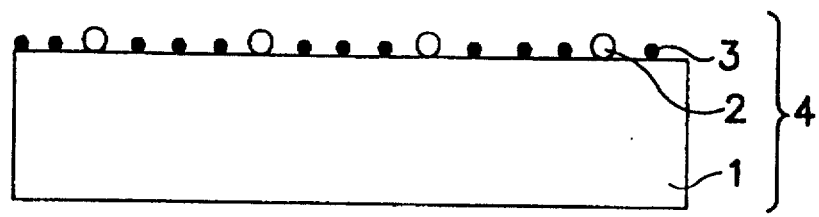
Figure 2C:
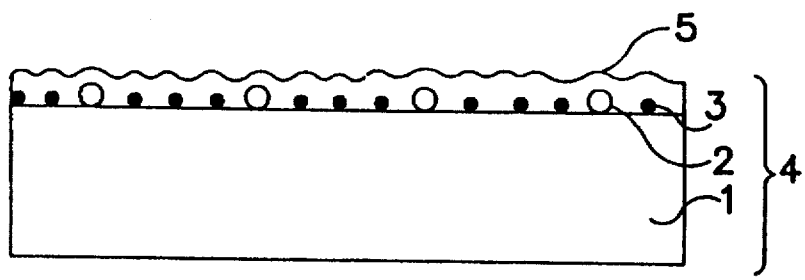

FIG. 2(a) to FIG. 2(c) show some exemplary manufacturing steps for a magnetic recording medium according to the present invention. Particularly, FIG. 2(c) shows a schematically enlarged cross-sectional view of the exemplary magnetic recording medium.

A flat surfaced polymer film 1 as shown in FIG. 2(a) is used as a base material, and inorganic particles 2 and organic particles 3 are dispersed uniformly and attached to the surface of the polymer film 1 to complete the composite polymer film 4 as shown in FIG. 2(b). A magnetic film 5 is disposed on the surface of the composite polymer film 4 to produce the magnetic recording medium as shown in FIG. 2(c).

There are no particular restrictions imposed on the materials for the polymer film 1, but polymers such as, for example, polyethyleneterephthalate, polythylenenaphthalate, polyimide, polyamide, polyaramid, polyvinyl chloride, polycarbonate, and the like can be used as the materials for the polymer film 1.

There are no particular restrictions imposed on the materials for the inorganic particles 2, but oxides, nitrides and carbides of such elements, for example, or silicon, titanium, aluminum, zirconium, magnesium, calcium, and the like usually used as the materials for the inorganic particles 2.

There are no particular restrictions imposed on the configuration of the inorganic particles 2. For example, the inorganic particles have lump-like and sphere-like shapes.

There are no particular restrictions imposed on the size of the inorganic particles 2, but an average particle diameter of not less than 30 Å and not greater than 350 Å, for example, is desirable. Where the average particle diameter is less than 30 Å, improved running characteristics and long-term reliability of the magnetic recording tapes is not realized. On the other hand, where the average particle diameter exceeds 350 Å, the electromagnetic conversion characteristics of the magnetic recording media is not much significantly improved because the loss factor caused by the spacing between the tape and head becomes large.

There are no particular restrictions imposed on the materials for the organic particles 3. Typically, plastics and resins such as polystyrene, polyacryl, polyurethane, polyethylene, polyphenylene sulfide, polysulfone epoxy resin, polyamide, polyimide, fluorocarbon resin, or solid organic particles of fatty acids and metal salts such as stearic acid, octyl acid, natural oil and fat, or organic substances in an emulsified state are used as the materials for the organic particles 3. There are no particular restrictions imposed on the configurations of the organic particles 3. There are no particular restrictions imposed on the particle diameter of the organic particles 3, but an average particle diameter of 100 Å or less, for example, is preferred. When the average particle diameter exceeds 100 Å, the size of the organic particles will become larger than that of the inorganic particles resulting in a reduction of the enhanced long-term reliability, and resulting in a negligable change in the electromagnetic conversion characteristics of the magnetic recording media because of the increased loss factor observed between the tape and head.

In connection with the particle diameter of both the inorganic particles 2 and organic particles 3 attached to the surface of the polymer film 1, it is desirable that the particle diameter of the inorganic particles 2 should be larger than that of the organic particles 3 for improving the long-term reliability of the magnetic recording media.

In connection with the number of particles per unit area for both the inorganic particles 2 and organic particles 3 attached to the surface of the polymer film 1, it is desirable that the number of the organic particles 3 per unit area be larger than the number of the inorganic particles 2 per unit area because the long-term reliability of magnetic recording media can be better enhanced because it is anticipated that the inorganic particles have an increased ability to disperse.

There are no particular restrictions imposed on the materials for the magnetic film 5, and such ferromagnetic metal compounds such as cobalt, nickel, iron, chromium either alone or in an alloy thereof or compounds thereof (an oxide and a nitride, for example) are typically used as the materials for the magnetic film 5. There are no particular restrictions imposed on the thickness of the magnetic film 5. However, where the thin film is formed by a vacuum deposition method, it is desirable that the thickness of the magnetic film 5 should not be less than 300 Å so that the electromagnetic conversion characteristics can be satisfactorily realized, and should not be more than 5000 Å since cracks tend to form as the thickness of the magnetic film 5 increases.

Next, the exemplary manufacturing method of the magnetic recording media of the present invention will be explained with the help of FIGS. 2(a)–2(c) and FIG. 3.

A mixed solution comprised of inorganic particles 2 and a solution containing organic particles 3 is coated on the flat surface of a polymer film which has already undergone a surface washing process and an electric charge removal process. Then the liquid ingredients thereof are removed to complete a composite polymer film 4 as shown in FIG. 2(b).

The liquid ingredients for the mixed solution include water, liquids of the alcohol group such as ethyl alcohol, liquids of the benzene group such as toluene, divinyl benzene, liquids of the ketone group such as acetone, methyl-ethyl ketone, liquids of the hydrocarbon group such as butane, hexane, liquids of the ester group such as acetic ethyl ester, and chloroorgano solvents such as chloroform.

One of the mixed solutions is a mixture prepared by uniformly dispersing inorganic particles 2 and organic particles 3 into an organic solvent or water.

An alternative mixed solution is a mixture prepared by first dissolving a solid organic substance in a liquid, and then forming fine organic particles 3 by adding a solution to the liquid which does not dissolve the organic substance. Then inorganic particles 2 are added to the liquid and dispersed. This method is effective in producing fine organic particles with a particle diameter not exceeding 100 Å.

Figure 3:
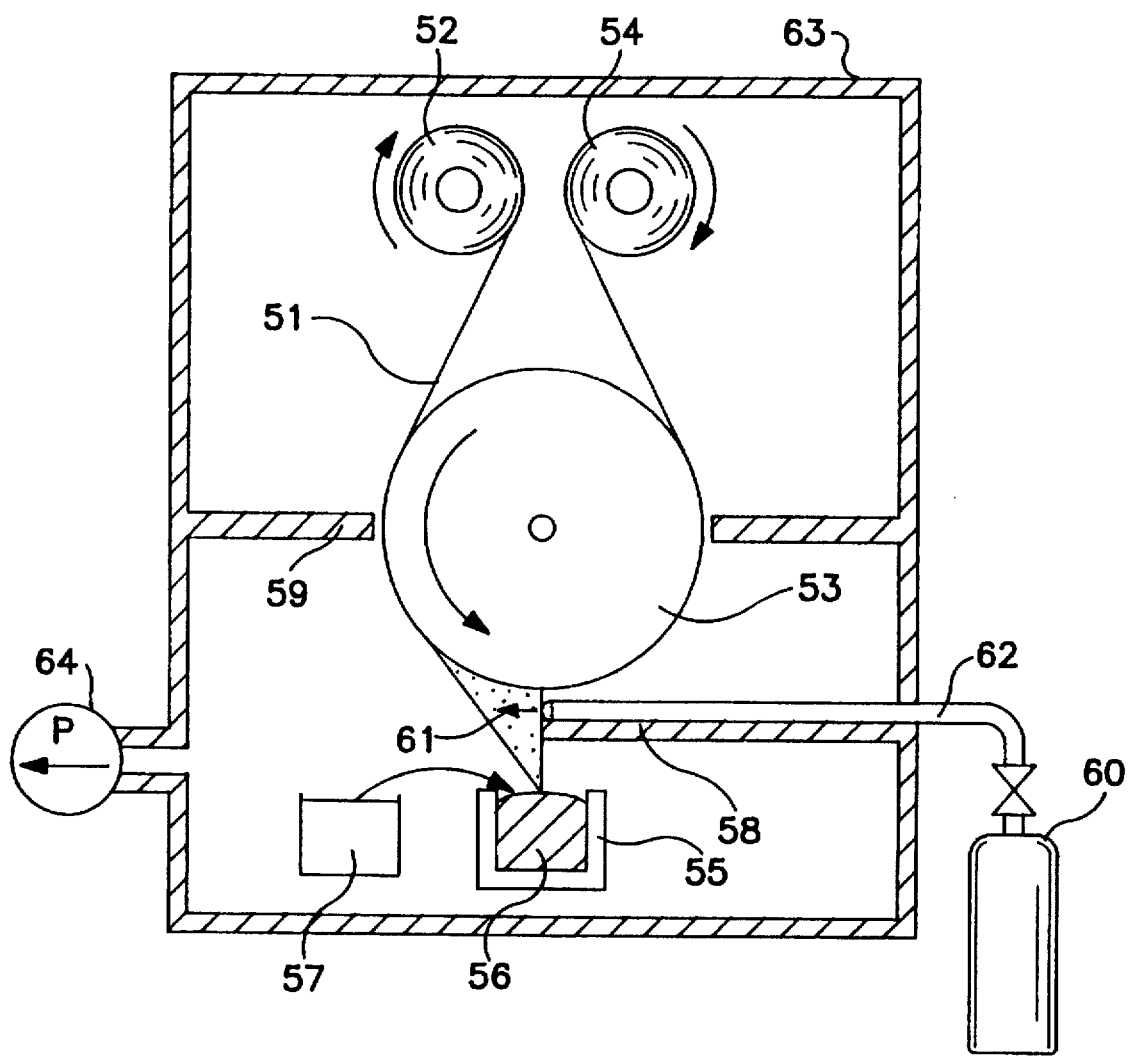
FIG. 3 shows a schematic illustration of the equipment as an exemplary embodiment of the manufacturing method for the magnetic recording media of the present invention to make a thin magnetic film used in manufacturing magnetic recording media.

FIG. 3 shows briefly how the equipment for depositing a metal compound film on the surface of a polymer film is constructed. With deposition equipment 63, a composite polymer film 51 is applied to a feed shaft 52 and wound around a winding shaft 54 by a rotating cooling can 53. A magnetic metal 56 is melted by electronic beams 57 in a ceramic melting pot 55. A nozzle 61 supplies oxygen gas from a suitable tank or cylinder 60 via a conduit 62. The inside of the deposition equipment 63 is exhausted of the air using a cryopump 64 and kept at a specified vacuum. Under the foregoing conditions, a thin film of a magnetic substance is formed by evaporation on the surface of the composite polymer film 51.

There are two alternatives for the deposition process, namely, a perpendicular vacuum deposition method and an oblique vacuum deposition method. In addition, it is possible to use a chemical vacuum deposition method whereby the surface of the composite polymer film 51 is exposed to oxygen gas 60. Using a chemical vacuum deposition method, cobalt in the form of a vapor flow, for example, is deposited in an oxygen ambient to form a cobalt oxide layer. One condition imposed by the oblique vacuum deposition method is that the constituent elements present in the range between 90° to 40° of the incident angle are to be deposited. Vapor flows of the metals not needed for deposition are eliminated by a mask 58. The metal vapor flow is prevented from extending to other areas, where the metal vapor is not needed, by a shielding plate 59. The vapor pressure at the time of deposition is desired not to exceed $1\times10^{-3}$ Torr. When the pressure is higher than this, deposition tends to become unstable.

Another exemplary embodiment of the present invention relates to a magnetic recording medium comprising a composite polymer film which is formed from a flat surfaced polymer film, a metal compound thin film disposed on the polymer film surface, both inorganic particles and organic particles dispersed and attached to the surface of the metal compound thin film, and a magnetic film disposed over the particles which are attached to the composite polymer film.

There are no particular restrictions imposed on the metal compound thin film, and metals such as aluminum, titan, silicon, calcium, copper, zinc, vanadium, cobalt, nickel, iron either alone, or in the form of an alloy thereof or a compound thereof (an oxide and a nitride, for example) are typically used as the metal compound thin film.

When the magnetic recording media with the foregoing structure is prepared according to the foregoing manufacturing method for use with video cassette recorders, the performance characteristics such as electromagnetic conversion characteristics, drop out performance of pictures, and running characteristics of magnetic recording tapes are excellent. The long term reliability to maintain these excellent performances even after repeated use of the magnetic recording tapes is also superior. Thus, the present invention enables the magnetic recording media to have a balanced and superior performance on the characteristics needed for a magnetic recording media.

Next, the present invention will be explained in greater detail according to specific examples thereof.

EXAMPLE 1

Figure 4:
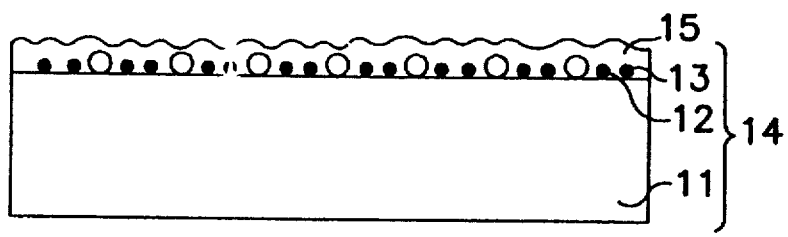
FIG. 4 shows a schematically enlarged cross-sectional view of the structure of a first exemplary embodiment of the present invention.

FIG. 4 shows a schematical cross-sectional view of the structure of a magnetic recording medium as a first exemplary embodiment of the present invention.

The flat surface of a tape of polyethyleneterephthalate film measuring 10 μm in thickness and 150 mm in width was coated with a mixed solution which had been prepared by uniformly dispersing polystyrene particles and silicon oxide particles into a solution.

The mixed solution was prepared by dissolving solid polystyrene in a divinylbenzene solution, having fine polystyrene particles formed by adding ethyl alcohol to the solution which does not dissolve the polystyrene, and then adding silicon oxide particles of 80 Å in average particle diameter thereto so as to have the particles uniformly dispersed in the solution. In this case, the particle content was 1000 ppm of silicon oxide and 2000 ppm of polystyrene, respectively. After coating, the solvent was removed by heating at 120° C., and a composite polymer film 14 with silicon oxide particles 12 and polystyrene particles 13 attached on the surface thereof was obtained. The mixed solution was coated to a thickness of about 90 Å. The average particle diameter of the polystyrene particles 13 was 50 Å.

The silicon oxide particles 12 were attached in a more exposed manner than the polystyrene particles 13. The number of the particles per one square μm was adjusted to be 20 particles of the silicon oxide particles 12 and approximately 40 particles of the polystyrene particles 13, respectively.

On the surface of said composite polymer film 14 where the particles 12 and 13 had been attached, an alloy of cobalt (80%) and nickel (20%) was deposited by means of a chemical vacuum deposition method to form a magnetic film 15 of 2000 Å in thickness. A film speed of 10 m/min, an oxygen gas supply of 0.5 1 /min, and an evaporation incident angle of 90° to 40° were employed as the conditions for deposition. By designing the number of nozzles for feeding oxygen gas to be 10, the gas flow was made uniform and constant. The temperature of the rotating cooling can was kept at 20° C. while the deposition process was taking place.

Accordingly, a magnetic recording medium for video cassette recorders, which has a deposited magnetic film 15 with the anisotropy easy axis thereof situated within its surface plane, was produced.

Sample 1 for Comparison

A magnetic recording medium was prepared by disposing a cobalt-nickel magnetic film on the surface of the same polymer film as used in Example 1 according to the same method employed in Example 1. Specifically, a magnetic recording medium of a structure with neither inorganic particles nor organic particles attached was prepared.

EXAMPLE 2

Figure 5:
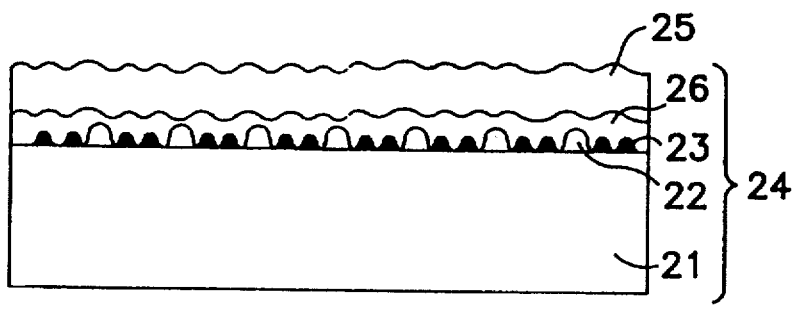
FIG. 5 shows a schematically enlarged cross-sectional view of the structure of a second exemplary embodiment of the present invention.

It is possible to make a modified version of the exemplary magnetic recording media according to the present invention, which has a nonmagnetic metal compound film disposed on the surface of a composite polymer film prepared by attaching both inorganic particles and organic particles on the surface of a polymer film, and by further disposing a magnetic metal film thereon. There are no particular restrictions imposed on the nonmagnetic metal compound, but metal compounds of cobalt, nickel, iron and the like (oxides and nitrides, for example) are typically used as the nonmagnetic metal compound. This exemplary embodiment of the present invention will be explained with the help of FIG. 5.

The flat surface of a tape of polyethyleneterephthalate film measuring 7 μm in thickness was coated with a mixed solution which had been prepared by uniformly dispersing stearic acid cobalt particles and titanium oxide particles into a solution. The mixed solution was prepared by dissolving cobalt stearate in methylethylketone, then having fine particles of cobalt stearate formed by adding hexane to the solution, and by further adding titanium oxide particles of 40 Å in average particle diameter so as to have the particles uniformly dispersed in the solution.

After coating, the solvent was removed by heating at 120° C., and a composite polymer film with titanium oxide particles and cobalt stearate particles attached on the surface thereof was obtained.

At this time, the mixed solution was coated to a thickness of about 50 Å. The average particle diameter of the attached cobalt stearate particles was 30 Å. In addition, the titanium oxide particles 22 were attached in a more exposed manner than the cobalt stearate particles 23. The number of the attached particles per one square μm was adjusted to be 10 particles of the titanium oxide particles 22 and around 30 particles of the cobalt stearate particles 23, respectively.

Then, a nonmagnetic cobalt oxide layer 26 of 200 Å thickness was formed on the surface of the composite polymer film 24 prepared with the particles 22 and 23 attached to the surface by use of an oblique vacuum deposition method with oxygen gas fed into the metallic vapor flow of cobalt 10 times greater in theoretical ratio. Further, an oxide film of nickel-cobalt alloy was deposited on the surface of the cobalt oxide layer by use of an oblique vacuum deposition method to form a magnetic film 25 having a 1500 Å thickness.

The incident angle of the oblique vacuum deposition ranged from 70° to 20°. The other conditions for the vacuum deposition were a deposition speed for the film of 30000 nm/sec, and a temperature of the rotating drum of 80° C.

Thus, a thin film type perpendicular magnetic recording medium with the anisotropy easy axis formed vertically was produced.

Sample 2 for Comparison

A magnetic recording medium was prepared first by attaching titanium oxide particles on the surface of the same polymer film as used in Example 2, and then by disposing a cobalt-nickel magnetic film according to the same method as was employed in Example 2 on the surface thereof. Specifically, a magnetic recording medium not having organic particles attached thereto was prepared.

EXAMPLE 3

Figure 6:
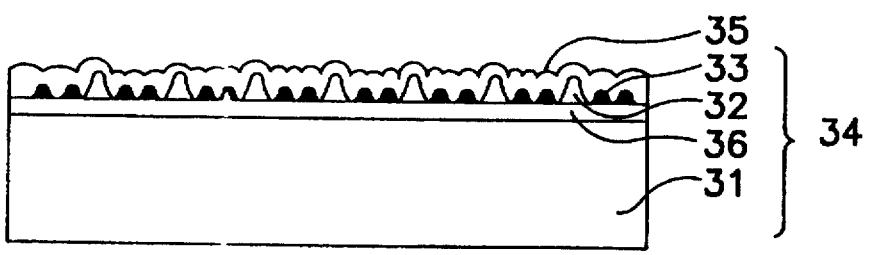
FIG. 6 shows a schematically enlarged cross-sectional view of the structure of a third exemplary embodiment of the present invention.
Figure 7:
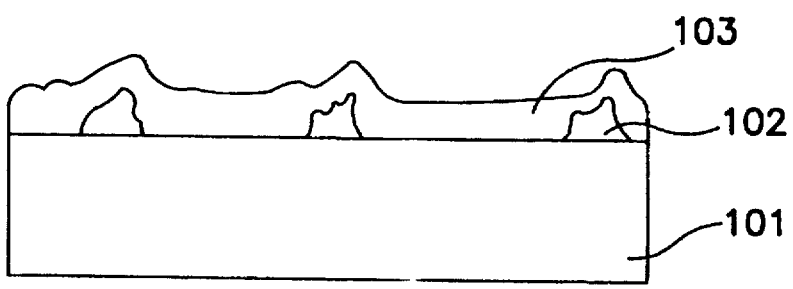
FIG. 7 shows a schematically enlarged cross-sectional view of the structure of a prior art magnetic recording medium.

Now, a magnetic recording medium, which was prepared first by disposing a metal compound thin film on the surface of a polymer film, and then by forming a composite polymer film which has inorganic particles and organic particles attached on the metal compound thin film, will be explained as an exemplary embodiment of the present invention with the help of FIG. 6. According to this structure, the characteristics of magnetic recording media can be further improved as compared with those of the previous examples.

The flat surface of a tape of polyimide film 31 having a thickness of 10 μm was deposited with an aluminum film 36 having a thickness of 150 Å. Then the surface of the aluminum film 36 was coated with a mixed solution, which had been prepared by uniformly dispersing polysulfone particles and silicon oxide particles in a solution. Specifically, the mixed solution was prepared first by dissolving polysulfone in methylethyl ketone, and then by adding ethanol to form fine particles of polysulfone in the mixture. Next, silicon oxide particles of an average particle diameter of 40 Å were added to the mixture to produce the mixed solution wherein particles were uniformly dispersed.

After coating, the solvent was removed by heating at 120° C. to form a composite polymer film with silicon oxide particles 32 and polysulfone particles 33 attached on the surface thereof.

The mixed solution was coated to a thickness of about 70 Å. The average particle diameter of the attached polysulfone particles 33 was 30 Å. In addition, the silicon oxide particles 32 were attached in a more exposed manner than the sulfone particles 33. The number of the attached particles per one square um was adjusted to be 10 particles of the silicon oxide particles 32 and around 30 particles of the sulfone particles 33, respectively. Then, a magnetic substance of cobalt-chromium alloy was deposited on the particles attached to the surface of the composite polymer film 34 by use of a vacuum deposition method as illustrated in FIG. 3 to produce a magnetic film 35 having a thickness of 1800 Å. The deposition conditions were that the incident angle at the start of deposition was 0° and the incident angle at the end of deposition was −20°, respectively. The deposition speed of the magnetic film was 3000 nm/sec, and the temperature of the rotating drum was 250° C.

Thus, a thin film type perpendicular magnetic recording medium with the anisotropy easy axis placed vertically was produced.

Evaluation tests for the different examples evaluating running characteristics of tapes, electromagnetic conversion characteristics,.drop out performance of outputted pictures, and long-term reliability were conducted on the tapes formed for each respective magnetic recording medium using 8 mm type video cassette recorders modified for conducting these particular tests. The evaluation of the tests are discussed hereinafter.

Evaluation of Running Characteristics

The running characteristics of magnetic recording tapes were evaluated by measuring load current of the tape driving cylinder, and friction coefficient of the rotation guide post for tape driving a video cassette recorder while the recorder was in operation. According to the measurement results, the running characteristics of the magnetic recording tapes tested were rated as very excellent by a symbol of ⊚, excellent by ◯, or poor by X.

Evaluation of Electromagnetic Conversion Characteristics

The electromagnetic conversion characteristics were evaluated by measuring the output (C) and the noise (N) at a recording frequency near 7 MHz on a video cassette recorder while the recorder was in operation, and calculating the ratio C/N. The ratio C/N obtained with Sample 1 for Comparison was taken as 0 dB and the relative value of the ratio C/N obtained comparing the tapes under test against that of Sample 1 for Comparison was examined.

Evaluation of Drop Out Performance

The drop out performance was evaluated by measuring the number of pictures missing from the reproduced pictures by using a drop counter. The number of missing pictures observed with Sample 1 for Comparison was taken as the reference value 1 and the relative value of the missing picture number measured with the tapes being tested was examined against that of Sample 1 for Comparison.

Evaluation of Long-Term Reliability

The long-term reliability of tapes was evaluated by measuring electromagnetic conversion characteristics and the still picture performance of tapes after repeated use of the tapes. According to the measurement results, the long-term reliability of the tapes subjected to tests were rated as very excellent by a symbol of ⊚, excellent by ◯, or poor by X. The evaluation results are combined in the table below.

|  | Running | Electromagnetic Conv. Charact. (dB) | Drop Out | Long-Term Reliability |
| --- | --- | --- | --- | --- |
| Example 1 | ⊚ | −1 | 1 | ⊚ |
| Sample 1 | X | 0 | 1 | X |
| Example 2 | ⊚ | −0.5 | 0.9 | ⊚ |
| Sample 2 | ◯ | −3.5 | 10 | ◯ |
| Example 3 | ⊚ | −0.8 | 0.8 | ⊚ |

Very Excellent: ⊚
Excellent: ◯
Poor: X

The analyses of the test results of the table is discussed hereinafter.

Evaluation by Comparing Example 1 With Sample 1 for Comparison

When the magnetic recording medium of Example 1 is compared with the magnetic recording medium of Sample 1 for Comparison, the electromagnetic conversion characteristics of Example 1 are low by 1 dB, the drop out number is equal, and the running performance as well as the long-term reliability of Example 1 are by far greater. The difference of 1 dB in the electromagnetic conversion characteristics does not matter much in practice. Accordingly, the magnetic recording medium of Example 1 can satisfy a variety of the characteristics required of a magnetic recording medium in a well balanced manner.

In contrast, when the magnetic recording medium of Sample 1 for Comparison was used, stopping of the magnetic tapes and a disturbance in still pictures occurred during the testing.

Evaluation by Comparing Example 2 With Sample 2 for Comparison

When the magnetic recording medium of Example 2 is compared with the magnetic recording medium of Sample 2 for Comparison, it is illustrated that the magnetic recording medium of Example 2 can satisfy a variety of the characteristics required of a magnetic recording medium in a well balanced manner. The electromagnetic characteristics of the magnetic recording medium of Example 2 are better than those of Sample 2 for Comparison by 3 dB. Although the envelope wave form of the output, which measures the uniformity of the tape surface, was flat for Example 1 and not showing any problems, imperfections were observed with Sample 2 for Comparison. The envelope wave form affects the drop out of pictures and Sample 2 for Comparison was missing as many as 10 times the amount of pictures as that of Example 2.

With regard to the long-term reliability, Example 2 was better than that of Sample 2 for Comparison. In order to investigate the reasons for this, an observation of the magnetic tape surface was conducted by using a scanning electron microscope. The roughness of the magnetic tape surface was observed by performing scanning tunneling microscopy. As a result, it was confirmed that the inorganic particles dispersed better in Example 2 than that of Sample 2 for Comparison. Furthermore, it was observed that the fine particles where attached but separated from one another without sticking together.

In contrast, for Sample 2 for Comparison, the inorganic particles were stuck together and formed to larger lumps thereof with uneven attachment of the lumps occurring. Projections of the attached inorganic particles ranged widely over 150 Å to 1000 Å in height. Such roughness as this existing on the surface of tapes caused deterioration in the output picture characteristics. In other words, the great unevenness of the tape surface caused imperfections in the envelope wave form, and the abnormal cohesion of particles resulted in drop out of pictures.

In addition, these abnormal projections and cohesion of particles were responsible for scars which occurred on the surface of the magnetic recording media, and also for uneven wear of heads. As a result, problems involved with running characteristics and long-term reliability were assumedly created.

Accordingly, by coating a mixture of inorganic particles and organic particles with the respective particle diameters different from each other, the particles were dispersed better. Consequently, the long-term reliability of the magnetic recording media was greatly improved against the repeated use thereof.

Evaluation by Comparing Example 3 With Example 1, Example 2, and Sample 2 for Comparison The magnetic recording medium prepared according to the method of Example 3 excelled in providing a good balance between all the characteristics when compared with that prepared by the method of Sample 2 for Comparison. In connection with the electromagnetic conversion characteristics, it excelled by the margin of 3 dB. The output envelope wave form was flat and no imperfections were observed. It showed excellent performances in terms of drop out, running characteristics, long-term reliability, and life in still pictures. When the magnetic recording medium of Example 3 was compared with the magnetic recording media of Example 1 and Example 2, were observed using scanning electron microscopy, the inorganic particles were found to be more extensively dispersed.

As explained in the foregoing, the magnetic recording media and the manufacturing method thereof disclosed by the present invention may contribute to satisfying all the performance requirements made of magnetic recording media in a balanced manner for electromagnetic conversion characteristics, a picture drop out performance, and running characteristics of magnetic recording tapes, and at the same time maintain the foregoing excellent performances even after repeated use of the magnetic recording tapes with resultant realization of excellent long-term reliability.

There is a possibility of deriving a variety of other embodiments of the present invention, besides the exemplary embodiments described herein, without deviating from the spirit or sacrificing principal characteristics thereof, and the foregoing examples should be considered as mere exemplary embodiments of the present invention in every respect, and should not be interpreted as restricting the present invention in any respect. Therefore, any derivative embodiments of the present invention should be considered to be covered by what is claimed by the present invention as long as such embodiments stay with the true spirit of the present invention and also remain within the scope thereof.

What is claimed:

1. Magnetic recording media comprising:
   a composite polymer film including:
   a. a polymer film having a flat surface, and
   b. inorganic particles and organic particles attached to said flat surface of said polymer film, wherein the average diameter of the organic particles is smaller than the average diameter of the inorganic particles with said inorganic particles and said organic particles uniformly dispersed on said polymer film, the number of said organic particles per unit area being larger than the number of said inorganic particles per unit area, and
   a metal thin film magnetic layer disposed over and attached to said inorganic particles and said organic particles attached to said polymer film.

2. The magnetic recording media according to claim 1, wherein the average diameter of the inorganic particles ranges from 30 Å to 350 Å.

3. The magnetic recording media according to claim 1, wherein the average diameter of the organic particles is smaller than 100 Å.

4. The magnetic recording media according to claim 1, wherein the metal thin film magnetic layer is a ferromagnetic metal compound film.

5. A magnetic recording media comprising:
   a composite polymer film including:
   a) a polymer film having a flat surface,
   b) a film of a metal compound disposed on said surface of said polymer film,
   c) inorganic particles and organic particles attached to said film, wherein the average diameter of the organic particles is smaller than the average diameter of the inorganic particles with said inorganic particles and said organic particles uniformly dispersed on said polymer film, the number of said organic particles per unit area being larger than the number of said inorganic particles per unit area, and
   a metal thin film magnetic layer disposed over and attached to said inorganic particles and said organic particles attached to said polymer film.

6. The magnetic recording media according to claim 5, wherein the average diameter of the inorganic particles ranges from 30 Å to 350 Å.

7. The magnetic recording media according to claim 5, wherein the average diameter of the organic particles is smaller than 100 Å.

8. The magnetic recording media according to claim 5, wherein the metal thin film magnetic layer is a ferromagnetic metal compound.

9. A magnetic recording media comprising:
   a polymer film having a flat surface,
   inorganic particles and organic particles attached to said flat surface of said polymer film,
   wherein the average diameter of the organic particles is smaller than the average diameter of the inorganic particles, with said inorganic particles and said organic particles uniformly dispersed on said polymer film, the number of the organic particles per unit area being larger than the number of said inorganic particles per unit area, the average diameter of said inorganic particles ranges from 30 Å to 350 Å,
   the average diameter of said organic particles is smaller than 100 Å,
   a nonmagnetic metal compound disposed over said inorganic particles and said organic particles, and
   a metal thin film magnetic layer formed on the surface of said nonmagnetic metal compound.

* * * * *